C. P. GRONBERG.
Harvester.
No. 21,414. Patented Sept. 7, 1858.
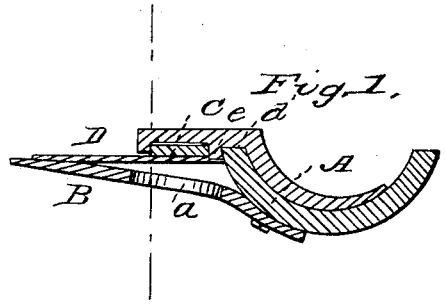
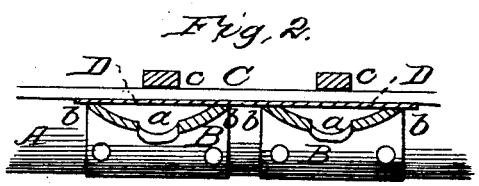
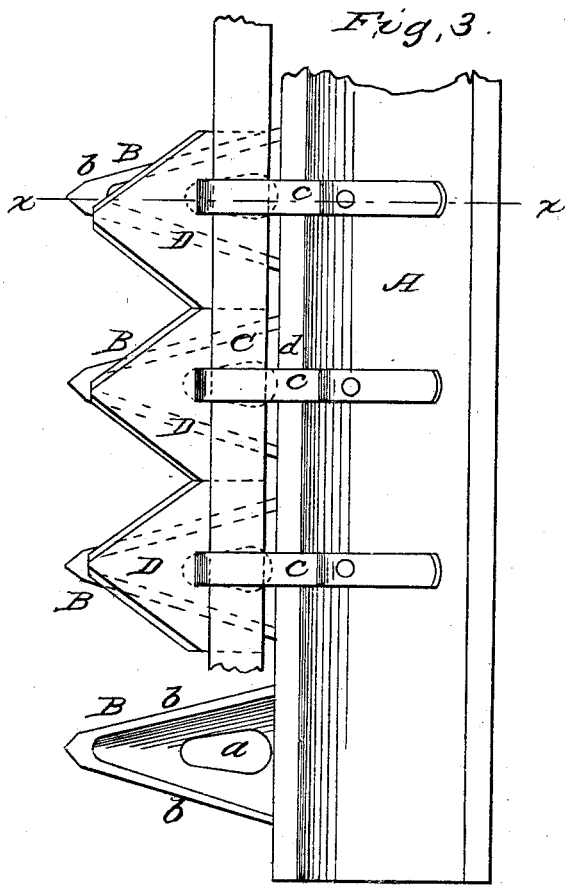

UNITED STATES PATENT OFFICE.

C. P. GRONBERG, OF MONTGOMERY, ILLINOIS.

IMPROVEMENT IN CUTTING DEVICES OF HARVESTERS.

Specification forming part of Letters Patent No. 21,414, dated September 7, 1858.

*To all whom it may concern:*

Be it known that I, C. P. GRONBERG, of Montgomery, in the county of Kane and State of Illinois, have invented a new and useful Improvement in the Cutting Devices of Grain and Grass Harvesters; and I do hereby declare that the following is a full, clear, and exact description of the same, reference being had to the annexed drawings, making a part of this specification, in which—

Figure 1 is a section of my invention, taken in the line $x\,x$, Fig. 3. Fig. 2 is also a section of the same, taken in the line $y\,y$, Fig. 1. Fig. 3 is a plan or top view of the same.

Similar letters of reference indicate corresponding parts in the several figures.

This invention consists in a peculiar construction and arrangement of the finger-bar and fingers, as hereinafter shown and described, whereby the parts above named may be constructed wholly of metal and still be extremely light and durable, and the sickle prevented from choking or clogging.

To enable those skilled in the art to fully understand and construct my invention, I will proceed to describe it.

A represents the finger-bar, which may be described as being of semi-cylindrical form, concave surface placed upward. This finger-bar is of metal, and to its front edge the fingers B are attached at suitable and equal distances apart. The fingers B are also of metal, of taper form, and may be described as being longitudinal sections of hollow cones. The concave surfaces of the fingers are uppermost, and each finger has an opening, $a$, made through it near its inner edge. The upper edges of the fingers B, at each side, are perfectly flat, so as to form sharp or angular edges, as shown at $b$. (See Figs. 2 and 3.)

C is the sickle-bar, to which the ordinary saw-shaped teeth, D, are attached. The bar C is fitted in guides $c$, attached to the finger-bar, and the teeth D rest upon and work over the edges of the fingers B, the basils by which the cutting-edges of the teeth D are formed being on the upper sides of the teeth, as shown clearly in Fig. 2. The guides $c$ of the bar C are so arranged or placed that a space, $d$, is allowed between the back edge of the bar and the front edge of the finger-bar A, as shown clearly in Figs. 1 and 3.

The finger-bar A may be made of metal plate of a suitable thickness, swaged or bent in proper form, and the fingers B may be constructed in a similar way; or they may be of cast metal.

By this invention the following advantages are obtained:

First. The finger-bar and fingers are made of the requisite degree of strength and with but a little weight of metal.

Second. The sickle is prevented from choking or clogging, as there is but a small bearing-surface for the teeth D. The teeth consequently will cut the grass or grain, and the gum or sap will pass down into the hollow of the fingers and escape through the openings $a$. Particles, also, of cut grass or grain that may work up over the sickle-bar C will work down through the opening or space $d$ down into the fingers, and large portions or fragments of cut grain or grass that may escape the opening or space $d$ will fall into the concave of the finger-bar, and will by the movement of the sickle be gradually worked out at either end, so that the sickle will not become choked or clogged thereby.

I am aware that concave fingers have been previously used, and also perforated fingers; and I am also aware that various forms of curved metal finger-bars have been employed in order to unite or combine strength and lightness. I therefore do not claim broadly and separately any of the parts irrespective of the construction and arrangement herein shown and described.

I claim therefore as new and desire to secure by Letters Patent—

The semi-cylindrical finger-bar A, concave and perforated fingers B, and the sickle formed of the bar C and teeth D, when the above-named parts are constructed, combined, and arranged for joint operation, substantially as and for the purpose set forth.

C. P. GRONBERG.

Witnesses:
J. G. BAKER,
RALPH GRAY.